US006833016B2

(12) United States Patent  (10) Patent No.: US 6,833,016 B2
Witter  (45) Date of Patent: Dec. 21, 2004

(54) DUST COLLECTION SYSTEM

(75) Inventor: Robert M. Witter, Syracuse, NY (US)

(73) Assignee: Oneida Air Systems, Inc, Syracuse, NY (US)

(*) Notice: Subject to any disclaimer, the term of this patent is extended or adjusted under 35 U.S.C. 154(b) by 0 days.

(21) Appl. No.: 10/402,441

(22) Filed: Mar. 27, 2003

(65) Prior Publication Data

US 2004/0187449 A1 Sep. 30, 2004

(51) Int. Cl.$^7$ .............................................. B01D 45/12

(52) U.S. Cl. ............................ 55/337; 55/345; 55/346; 55/385.1; 55/428; 451/88

(58) Field of Search ....................... 95/268; 55/DIG. 18, 55/337, 385.1, 385.2, 342, 345, 346, 344, 428, 429, 430, 431; 451/87, 88, 456, 453

(56) References Cited

U.S. PATENT DOCUMENTS

| | | |
|---|---|---|
| 926,206 A | 6/1909 | Morse |
| 1,260,407 A | 3/1918 | Lachmann et al. |
| 1,897,144 A * | 2/1933 | Prouty .......................... 209/712 |
| 1,905,458 A | 4/1933 | Gaffney |
| 2,616,563 A | 11/1952 | Hebb .......................... 209/144 |
| 2,770,924 A * | 11/1956 | Mead et al. .................... 451/88 |
| 3,120,432 A * | 2/1964 | Aldrich ........................ 55/315 |
| 3,392,513 A | 7/1968 | Hedin .......................... 55/425 |
| 3,426,513 A | 2/1969 | Bauer .......................... 55/459 |
| 3,485,671 A * | 12/1969 | Stephens ....................... 134/7 |
| 3,513,642 A | 5/1970 | Cornett ........................ 55/399 |
| 3,533,327 A * | 10/1970 | Hagerty ....................... 409/137 |
| 3,618,302 A | 11/1971 | Cornett ...................... 15/327 R |
| 3,771,294 A * | 11/1973 | Ronning ....................... 55/345 |
| 3,850,816 A | 11/1974 | Koch .......................... 210/512 |
| 3,953,184 A | 4/1976 | Stockford et al. ............. 65/458 |
| 4,133,658 A * | 1/1979 | Callewyn ...................... 55/315 |
| 4,198,290 A | 4/1980 | Summers ...................... 209/144 |
| 4,201,256 A * | 5/1980 | Truhan ...................... 144/252.2 |
| 4,223,748 A * | 9/1980 | Barendsen ..................... 175/66 |
| 4,232,487 A * | 11/1980 | Brown .......................... 451/88 |
| 4,234,274 A | 11/1980 | Hoshall ........................ 406/93 |
| 4,246,013 A | 1/1981 | Truhan et al. ................. 55/340 |
| 4,326,864 A * | 4/1982 | Sittler ......................... 55/364 |
| 4,344,538 A | 8/1982 | Fujisawa et al. ............. 209/144 |
| 4,367,665 A * | 1/1983 | Terpstra et al. ............... 83/100 |
| 4,572,726 A | 2/1986 | Van Abbema ............... 55/337 |
| 4,576,072 A * | 3/1986 | Terpstra et al. ............ 83/102.1 |
| 4,581,050 A | 4/1986 | Krantz ......................... 55/269 |
| 4,600,410 A | 7/1986 | Baillie et al. ................... 55/1 |
| 4,646,482 A * | 3/1987 | Chitjian ........................ 451/87 |
| 4,735,639 A | 4/1988 | Johnstone ..................... 55/302 |
| 4,917,712 A | 4/1990 | Crigler .......................... 55/96 |
| 4,977,638 A * | 12/1990 | Best ............................. 15/301 |
| 5,056,275 A * | 10/1991 | Wada et al. .................... 451/87 |
| 5,080,697 A | 1/1992 | Finke ........................... 55/97 |
| 5,106,488 A | 4/1992 | Jonasson ...................... 209/17 |
| 5,158,583 A * | 10/1992 | Bodin et al. ................. 299/1.4 |
| 5,163,786 A | 11/1992 | Chrisianson ................. 406/41 |
| 5,195,640 A * | 3/1993 | Seaverns ....................... 209/2 |
| 5,231,805 A * | 8/1993 | Sander ......................... 451/88 |

(List continued on next page.)

Primary Examiner—Duane S. Smith
(74) Attorney, Agent, or Firm—Bernhard P. Molldrem, Jr.

(57) ABSTRACT

A dust collection system for portable sanding or grinding equipment employs a cyclone separator mounted directly on the tool or machine, with a dust outlet duct at the narrow lower end of the cyclone, and a cartridge air filter mounted on the top of the cyclone. The filter returns the air flow from the machine to the ambient air in the vicinity of the tool. The dust is concentrated in the cyclone, and a small volume air flow then moves the dust through an elongated flexible hose or duct to a remote dust collection station. An air pump at the remote dust collection station provides sufficient air flow to draw the small volume of air plus entrained dust from the tool-mounted cyclonic separator. A cyclonic separator at the remote station separates this dust from the air flow and deposits it in a collection tank or drum.

9 Claims, 4 Drawing Sheets

U.S. PATENT DOCUMENTS

| | | | |
|---|---|---|---|
| 5,254,147 A | 10/1993 | Finke | 55/337 |
| 5,271,751 A | 12/1993 | Lagler | 55/293 |
| 5,529,530 A * | 6/1996 | McPhee et al. | 451/88 |
| 5,606,767 A | 3/1997 | Crlenjak et al. | 15/301 |
| 5,716,260 A * | 2/1998 | Griffin et al. | 451/87 |
| 6,289,956 B1 * | 9/2001 | Shriver | 144/252.1 |
| 6,434,784 B1 | 8/2002 | Wisser | 15/314 |
| 6,471,751 B1 | 10/2002 | Semanderes et al. | 95/271 |
| 6,482,078 B1 * | 11/2002 | Pittman | 451/87 |
| 2004/0053561 A1 * | 3/2004 | Pieper | 451/38 |

\* cited by examiner

Top View of Cyclone

Fig. 8

DUST COLLECTION SYSTEM

BACKGROUND OF THE INVENTION

This invention is directed to devices and equipment for removing process dust coming from a dust generating machine, such as a sanding machine, and separating the dust from exhaust air flowing from the machine. The invention is more specifically directed to a compact and efficient system for removing the production dust from the work area to a dust collection station located beyond the work area, and which removes a majority of the air from the dust flow.

For many types of machines for processing a workpiece, some means has to be provided to dispense with the grindings, chips, and particulate matter that is generated by the machine during operation. For example, in the case of wood working machines, such as sanders, joiners, and the like, wood that is removed from a workpiece has to be collected and removed from the work area so as to avoid either a breathing hazard for the workman or a fire hazard. More specifically, in the case of portable equipment, such as floor sanders and edgers, it is conventional to draw off the dust that is generated by the machines and then send the air that is carrying the dust into a filter bag arrangement. An alternative technique is to attach a flexible hose or conduit to the dust outlet duct of the machine, and pump the air in the conduit, plus the entrained dust, to a collection station outside. For hand-held and mobile power tools, such as floor sanding equipment, the associated dust collection systems currently in use are cumbersome, impractical, or inadequate.

Two systems are currently in use. In one system, a blower on the machine is used to extract dust from the sanding or cutting operation, and the air and entrained dust go into a filter to collect the dust and filter the air. Work operations have to be suspended frequently to clean the filter and dispose of the collected dust. These maintenance-intense systems blind or clog readily, which reduces the pickup volume at the source, allowing the particulate waste to become airborne or to interfere with the operation. In the second system a flexible hose connects the unit to an external dust collection unit which draws the waste from the tool. These systems do not deliver the necessary air volume to the tool because of intrinsic mechanical problems of delivering air through the extended lengths of flexible tubing. Huge energy requirements and high air velocities are necessary to overcome frictional losses. Frictional losses in ducts increase exponentially with air velocity, so very wide diameter tubing is used, and this relatively large tubing, being quite cumbersome, hinders the operator in using the machine.

The system of long flexible hoses for collecting dust from portable wood sanding machines generally require a combination of a number of different hoses of various diameters, and a series of air pumps and blowers to maintain a satisfactory air draw. In addition, because all of the air that exits the sanding machine has to be carried all the way out to a remote collection station, the flexible hoses are required to have a rather large diameter.

A filter bag that is carried on the portable sanding machine is generally not satisfactory for a number of reasons. First, the bags are either too porous and do not remove enough particulates from the air, or are too fine and tend to clog after a period of operation, choking off the flow of exhaust air from the machine. Also, the bag collection system concentrates the fine particulates of a combustible material (wood dust), and this dust can ignite if a spark or heated material from the sanding operation lands in the bag. Such a situation can produce an explosion, and thus exposes the worker to an unnecessary danger.

A number of cyclonic separators have been proposed, typically for separating particulate matter, such as grain, powders, or dust, from a flow of air. However, to date, no one has proposed or considered mounting a cyclonic separator on a portable sander or other dust generating device so as to concentrate the dust and allow a smaller air flow, and a smaller conduit, to be used in moving the dust to the remote dust collection station.

OBJECTS AND SUMMARY OF THE INVENTION

Accordingly, it is an object of this invention to provide a highly energy efficient cyclonic separator-based dust collection system that avoids the drawbacks of the prior art.

It is a more specific object to provide a dust collection system in which the air pressure drop is dramatically reduced as compared with prior art dust collection systems.

It is a further object of this invention to provide a dust collection system in which a majority of the separation of dust from the exhaust air and the filtering of the exhaust air are carried out at the dust-generating machine or tool.

It is another object to provide dust collection system which reduces the power requirement, and also reduces the inherent fire or explosion hazard of the dust collection equipment.

According to an aspect of the invention, a compact and efficient dust collection system is provided for collecting production dust from a floor sander or other source machine that generates such dust in a production operation. The source machine has an internal blower for picking up the dust that the machine generates and exhausting the dust, entrained in a stream of air, to an exhaust outlet on the source machine. A compact, low-volume cyclonic separator is mounted on the source machine. The cyclonic separator has an inlet portion at the top, and an inner tubular baffle coaxial with the upper inlet portion and having open ends. The inlet portion and inner baffle define between them an annular inlet space. A frustoconic portion beneath the upper inlet portion and having a wide end joined at the inlet portion and this descends to a narrow lower end, where there is a dust outlet duct. An inlet duct receives the air flow and exhaust dust from the machine and injects this air flow into the annular inlet space. a pleated air filter, or equivalent air cleaning means, is situated above cyclonic separator for cleaning air that passes out through the tubular baffle. This permits the filtered clean air to return into the ambient air in the vicinity of the source machine. The dust is then concentrated at the bottom of the cyclonic separator. An elongated flexible duct or hose is coupled from the dust outlet duct of the cyclonic separator to a dust collection station positioned remote from said source machine. Because the dust is concentrated in the cyclonic separator, the air flow or volume required for conveying the dust to the dust collection station is reduced by a factor of between five and ten as compared with the systems discussed previously. This is because the secondary air flow between the separator and the dust collection station is used only for moving the preseparated dust, and does not have to supply the correspondingly greater air volume that is required to extract the waste dust from the cutting operation at the tool. Because the secondary air flow is reduced so greatly, a much smaller diameter hose can be used, typically ¾ inch to 1 inch. This tubing can be bundled with the electric cord for the tool, and thus will not interfere with operation of the sander or other tool.

In a preferred embodiment, a rigid hollow conduit both serves as the tubing connecting the outlet of the machine to the cyclonic separator and as the means for supporting the cyclone separator on the machine.

The system can be run at a lower power requirement, e.g., at 110 volts, which is an advantage in that many non-commercial locations do not have 220 volts or three-phase power. The operator can continue to work without interruption, as the dust is carried to a much larger receptacle at the dust collection station. There is increased fire safety, as the heat and sparks that can result from the grinding or sanding operation are far from the dust storage location. An improved inlet port for the cyclonic separator permits superior dust pickup and better separation with less back pressure resulting from the separation. Industrial hygiene is vastly improved.

a second cyclonic separator can be used at the outside dust collection station, separating the dust from the incoming air flow, and dropping the dust from the nose of the cyclonic separator into a drum or similar receptacle.

The above and many other objects, features, and advantages of this invention will become apparent from the ensuing detailed description of the preferred embodiments, which is illustrated in the accompanying Drawing.

DETAILED DESCRIPTION OF A PREFERRED EMBODIMENT

Figure 1:
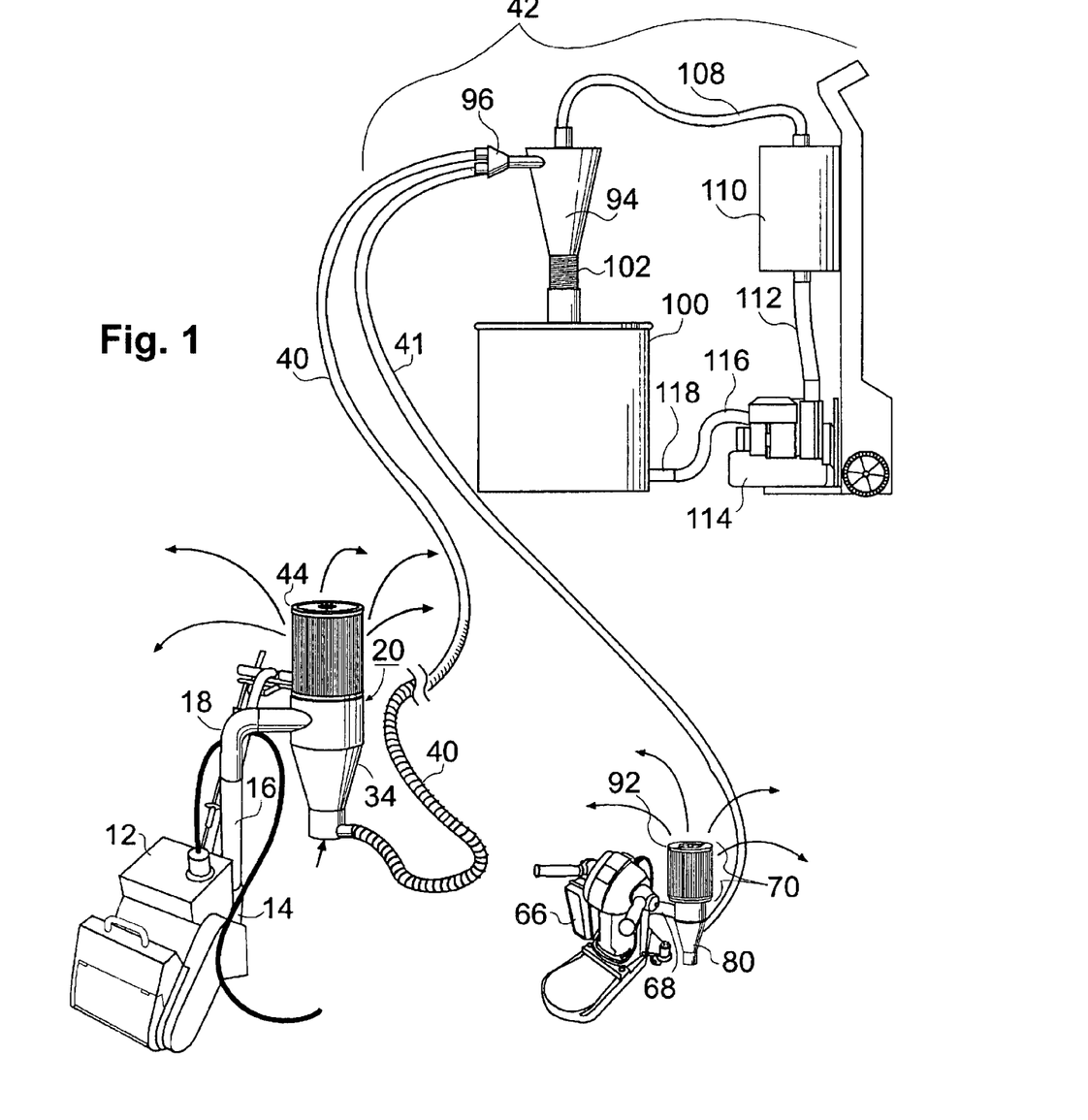
FIG. 1 is a perspective system view of a dust collection system for a floor sander and an edger, according to one embodiment of this invention.

Now with reference to the Drawing, FIG. 1 shows a dust collection system according to an embodiment of this invention in which dust is separated from the air flow at the tool or machine, with the air being cleaned and returned to the ambient in the vicinity of the tool and with the dust being transported on a smaller volume air flow to a remote collection site.

A dust generating machine or tool, here a floor sanding machine 12, has a built-in exhaust blower 14 that vacuums up any sanding dust produced and discharges it upwards through an upright pipe 16. An inlet-connection ell 18 is mounted at a top end of the pipe 16, and a compact cyclonic separator 20 is supported on the ell 18. In this embodiment, the cyclonic separator 20 has a barrel or drum 22 at its upper end. The cyclonic separator can be described with additional reference to FIGS. 2, 3, and 4. An inlet pipe 24 that fits into the ell 18 extends though the barrel 22, as will be discussed later. a tubular baffle 26, which has open upper and lower ends, is disposed coaxially within the separator barrel 22. This baffle 26 can be cylindrical in some cases, and here has a tapered, frustoconic shape. An upper annular plate 28 closes off the top of the barrel 22, with the baffle 26 extending to or penetrating through a central opening in this plate 28. The baffle 26 and barrel 22 define between them an inlet space 30 beneath the upper plate. A distal end 32 of the inlet pipe 24 protrudes into a central portion of this inlet space 30, and this geometry reduces turbulence and back pressure at this point, providing a more efficient air flow.

Figure 2:
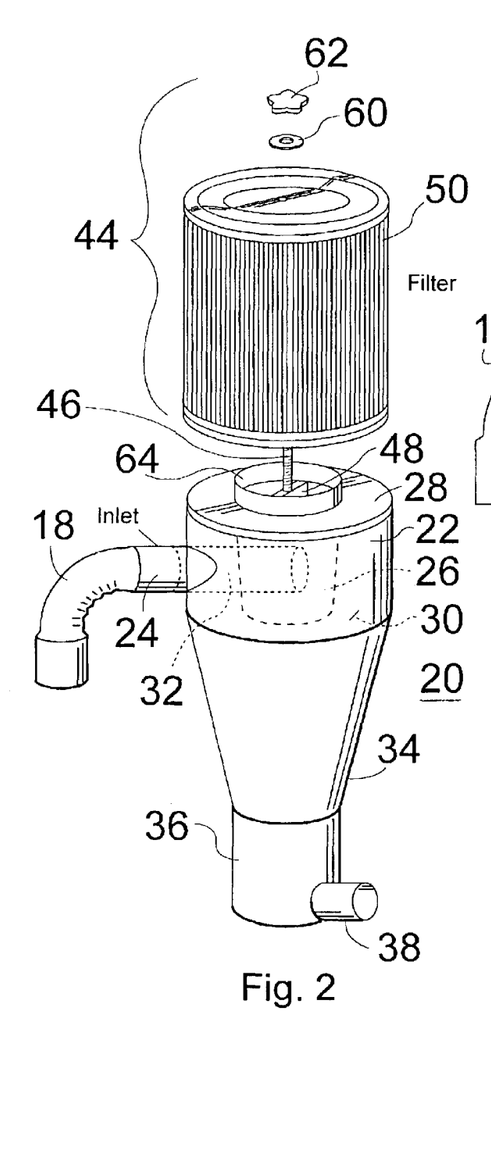
FIG. 2 is an assembly perspective view of the cyclonic separator that is mounted onto the floor sander, according to this embodiment.

A frustoconic cyclone portion 34 has a wide, upper mouth joined to the barrel 22, and the cyclone portion 34 tapers downward to a smaller opening at its nose, where a dust cup 36 collects the sanding dust that is separated from the spiraling internal air flow. An dust outlet pipe or exhaust pipe 38 protrudes from the dust cup 36, and an elongated flexible hose or conduit 40 (see FIG. 1) carries off the sanding dust in a small-volume air flow to an outside remote dust collection station 42. The dust collection station will be discussed later.

Figure 3:
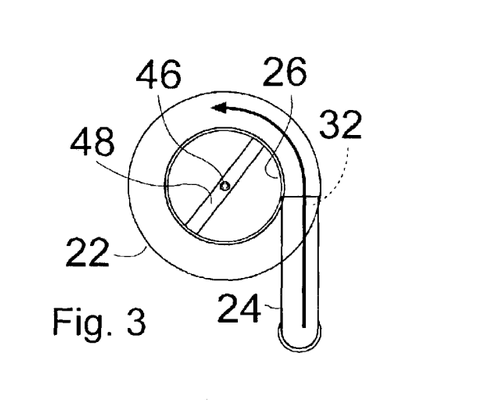
FIG. 3 is a top view of the barrel of the cyclonic separator of FIG. 2.

An air filter assembly 44 positioned atop the cyclonic separator 20 filters the air that flows from the sanding machine 12 and through the separator 20, and returns the filtered air back to the ambient space. As shown in FIGS. 2 and 3, this assembly includes a vertical threaded post 46 mounted on a brace 48 across the mouth of the internal baffle 26, which extends upwards above the plate 28 along the vertical axis of the separator 20. a pleated cylindrical filter cartridge 50 is positioned here and held in place on the post 46 using a washer 60 and thumb nut 62.

In this embodiment, an upper portion 64 of the baffle 26 protrudes above the annular plate 28, forming a cylindrical flange that fits into a circular opening (not shown) in the base of the cartridge 50.

Figure 4:
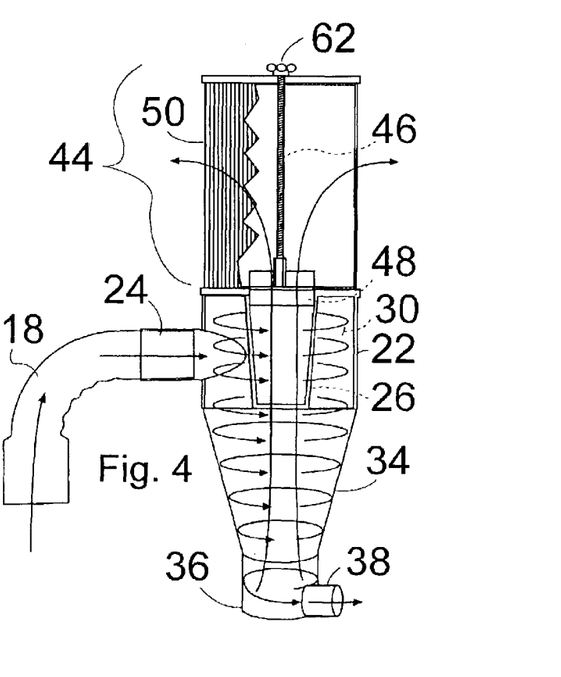
FIG. 4 is a schematic elevation showing flow of air and waste for the cyclonic separator of FIG. 2.

FIGS. 3 and 4 illustrate the air flow through the cyclonic separator 20. The air enters via the inlet pipe 24 into the space 30, and then proceeds on a downward spiral path towards the dust cup 36 and the lower nose of the cyclone 34. The sanding dust remains in the cup, and the airflow proceeds upwards along the axis or core, through the baffle 26, and out through the filter assembly 44. The cyclonic separator presents only a small back pressure to the exhaust blower 14 on the machine 12, and only a minor air flow volume, provided as a suction or draw from the remote dust collection station 42, is needed to move the concentrated dust from the dust cup 36 out through the flexible conduit 40. This permits the conduit 40 to be small in diameter, e.g., ¾ inch in most applications, and this is far less cumbersome than the large diameter conduits required by the prior and present remote-collection systems. The power cord for the machine can also be bundled with the flexible conduit 40, which has advantages for the operator.

Figure 5:
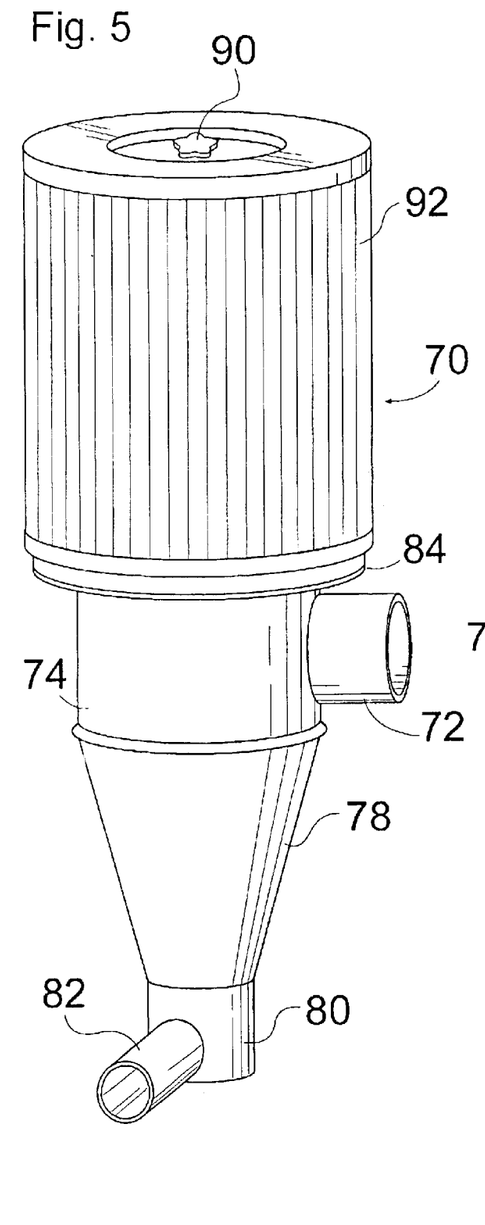
FIG. 5 is a perspective view of the cyclonic separator that is mounted onto the edger machine according to this embodiment.
Figure 6:
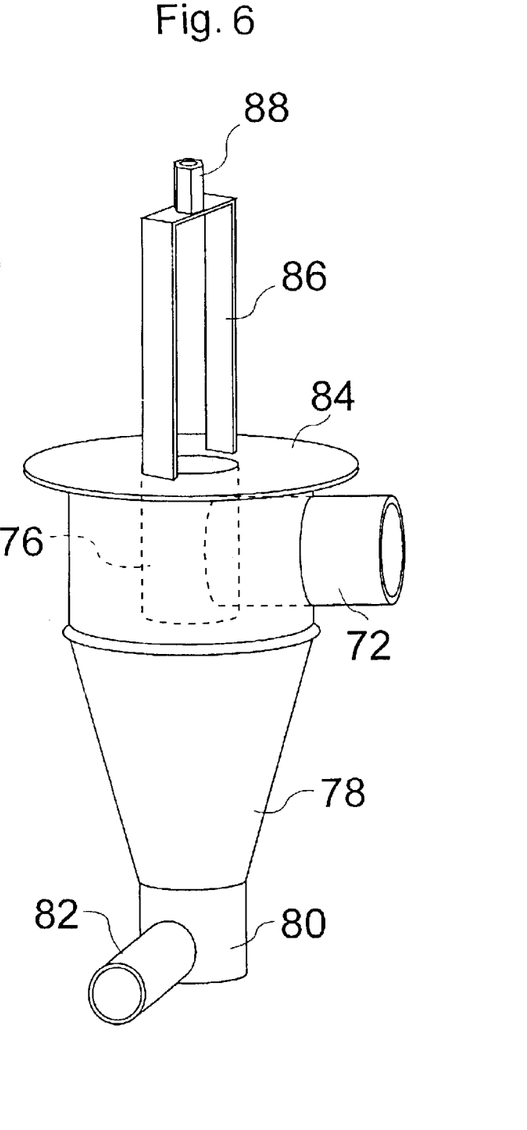
FIG. 6 shows the cyclonic separator of FIG. 5 with filter cartridge removed, and with some hidden elements illustrated in dash lines.

As also shown in FIG. 1, a second tool can also be provided with a cyclonic dust collection system, and in this embodiment, an edge sander or edging tool 66 is shown. The edger 66 has an internal exhaust blower (not shown), which picks up process dust and blows it through an exhaust pipe 68, here a rigid tubular member that also supports a cyclonic separator 70. This separator can be of a smaller size than the separator 20. An inlet pipe 72 is fitted into the pipe 68 and extends into a barrel 74 of the separator. An inner baffle 76 is disposed coaxial with the barrel 74. A frustoconic cyclone 78 is joined with the barrel 74 and tapers downwardly terminating at a dust cup 80, from which a dust outlet pipe 82 extends. A second flexible small-diameter conduit 41 then leads from the dust cup 80 to the remote collection station 42.

An annular plate 84 closes off the top of the barrel 74, and a support bracket 86, here formed with two upwardly extending legs, rises vertically above the opening at the center of the plate 84. a post 88 with internal female threads is supported on top of the bracket 86. a thumb wheel 90, having a male threaded shaft (not shown), is used to secure a pleated cylindrical filter cartridge 92 in place against the top of the cyclonic separator 70.

Figure 7:
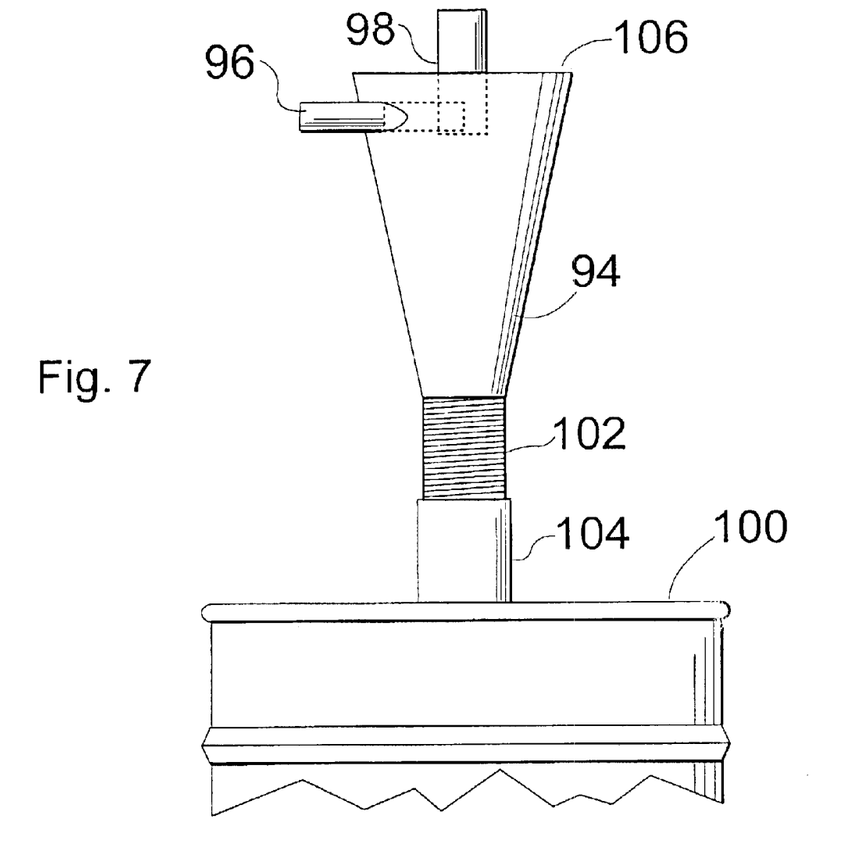
FIG. 7 shows the cyclonic separator that is mounted onto the collection drum at the dust collection station according to this embodiment.
Figure 8:
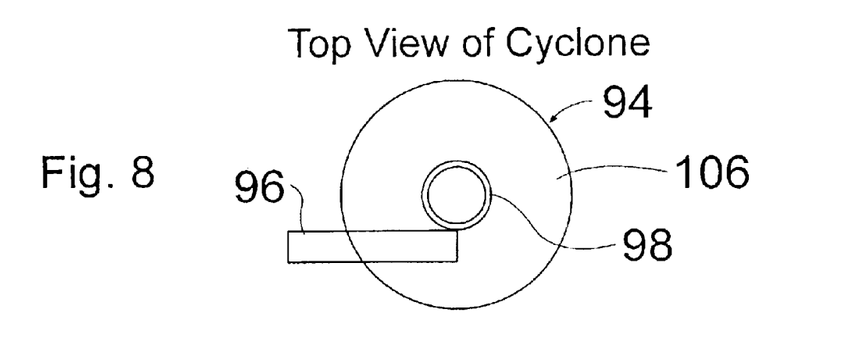
FIG. 8 is a top view of the cyclonic separator of FIG. 7.

Details of the remote collection station 42 of this embodiment are illustrated in FIG. 1 with additional reference to FIGS. 7 and 8. Here, a cyclonic separator 94 disposed at the remote station is of frustoconic shape, with an inlet pipe 96 that is fed from the conduits 40 and 41 with the process dust from the machines 12 and 66. a siamese connection can be used here. This separator also has an internal tubular baffle 98, disposed coaxial with the frustoconic separator 94, and having an upper portion that extends above the top of the separator to serve as an air exhaust port. A dust conduit 102 extends downward from a nose of the separator 94 into a dust collection drum 100 (or other dust storage vessel). In this case a top of the drum 100 has a fitting 104 that connects with the dust conduit 102. As shown in the top view of FIG. 8, an upper annular plate 106 closes off the top of the cyclonic separator 94, and the inlet pipe 96 protrudes into the middle of the volume that is defined between the wall of the cyclonic separator 94 and the tubular baffle 98.

Referring again to FIG. 1, exhaust air from the separator 94 is carried via a conduit 108 to a filter unit 110 which removes remaining particulates in the exhaust air, and thence via another conduit 112 to an air pump 114. The pump provides a draw of vacuum that moves the dust, plus a relatively small flow of air, from the dust cups 36, 80 of the separators on the two tools, through the elongated flexible conduits 40 and 41 to the dust collection station 42, where the air flow continues through the cyclonic separator 94, so that the process dust ends up in the barrel 100.

Because the dust and exhaust are from the tool are separated out at the cyclone separators 20 and 70, only a small amount of air flow is needed to carry away the dust to the remote dust collection station 42. The air volume to the tool can be reduced by a factor of between five and ten times, because it is only used to extract the preseparated waste, and is not supplying the considerably greater air volume needed to extract the waste from the cutting or sanding operation.

The independent stand-alone dust collection station 42 downstream of the filter/separators 20 and 70 contains all the processing waste from the portable processing equipment, which is recovered by means of a small negative pressure operating through the cyclone separator 94. The drum or barrel 100 can be provided with a plastic bag liner. As the dust barrel is at a negative pressure, a vacuum bag hold down feature is employed, in which a hose 116 extends from the pump 114 to a vacuum inlet fitting 118 on the barrel 100, to maintain a vacuum or negative pressure between the barrel and the plastic bag liner to draw and hold the bag to the inside of the barrel. The bag can be tied off and lifted out when full, thus eliminating the need to dump. This also keeps the operators from being exposed to the fines and dust contained in the bag. The independent stand-alone nature of the waste collection drum or barrel 100 also allows for different size barrels to be interchanged easily and cost effectively, accommodating the scope of the project and the volume of waste material to be collected.

The advantages over the prior art dust collection systems can be quickly summarized as follows: There is a low power/low energy requirement, and the system can be powered entirely from a 110V single phase supply. The small flexible tubing 40 for carrying the dust from the tools makes machine operation vastly easier, and the tubing can even be bundled with the power cord for the tool. The operator does not need to interrupt the sanding, grinding, or finishing process for the purpose of unclogging or emptying bags or filters, or for removing waste bags from the tool or machine, as the waste material is carried continuously from the tool to a large off-worksite container. There is improved fire safety as any friction-induced flame or sparks will not reach the storage location for the combustible waste materials; that is, the waste collection barrel is far downstream of the grinding or sanding operation, and is at a location far from the operator. The high-efficiency cyclone separators, with low pressure drop inlet tubes, provide for superior dust pick up at the tool, and permit the waste material to be carried off without significant back pressure. The filter service interval is also very long, and pressure loss through the filter cartridges is also very low. The filtration of air and separation of dust vastly improves the industrial hygiene for the operators.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

I claim:

1. A dusk collection system for collecting production dust from a source machine that generates such dust in a production operation, said source machine having a blower means for picking up said dust and exhausting the dust entrained in a stream of air to an exhaust outlet on the source machine; comprising a cyclone separator mounted on said source machine, said cyclone separator including a circular upper inlet portion, an inner tubular baffle coaxial with the upper inlet portion and having open ends, the upper inlet portion and inner baffle defining between them an annular inlet space, a frustoconic portion beneath the upper inlet portion and having a wide end joined to the upper inlet portion and a narrow lower end, a dust outlet duct at said narrow lower end, an inlet duct extending from outside the upper inlet portion into said annular inlet space;

air cleaning means above upper inlet portion for cleaning air that passes out through said inner tubular baffle and permitting the air to return into ambient air in the vicinity of said source machine;

a first conduit coupled between the exhaust outlet on the source machine and the inlet duct of the cyclone separator; and an elongated flexible duct coupled from said dust outlet duct to a dust collection station positioned remote from said source machine, for conveying a minor flow of air plus dust entrained therein to the dust collection station.

2. A dust collection system according to claim 1 wherein said air cleaning means includes a replaceable air filter removably positioned above said outer cylinder.

3. A dust collection system according to claim 2 wherein said air filter is in the form of a cylinder mounted coaxially with said cyclone separator.

4. A dust collection system according to claim 1 wherein said inlet duct penetrates to a region of said annular inlet space that is midway between said upper inlet portion and said inner tubular baffle.

5. A dust collection system according to claim 1 wherein said first conduit is a rigid hollow member forming means for supporting said cyclone separator on said source machine.

6. A dust collection system according to claim 1 wherein said inlet portion and said tubular baffle are in the form of coaxial cylinders.

7. A dust collection system according to claim 3 further comprising a threaded post extending upward at an axis of said tubular baffle and above said cyclone separator, and female threaded means for holding said filter in place on said threaded post.

8. A dust collection system according to claim 1 wherein said dust collection station includes a second cyclone separator having an inlet port to which said elongated flexible duct is connected, a dust collection drum positioned below a lower end of said second cyclone separator for receiving the dust carried to it through said elongated flexible duct, an pump for drawing air through said second cyclone separator, and an air filter interposed between an outlet baffle of said second cyclone separator and said air pump.

9. A dust collection system according to claim 1 wherein said elongated flexible conduit is a hose of about ¾ inch to one inch in diameter.

\* \* \* \* \*

UNITED STATES PATENT AND TRADEMARK OFFICE
CERTIFICATE OF CORRECTION

PATENT NO.    : 6,833,016 B2
DATED         : December 21, 2004
INVENTOR(S)   : Robert M. Witter It is certified that error appears in the above-identified patent and that said Letters Patent is hereby corrected as shown below:

Column 6,
Line 32, "dusk" should read -- dust --

Signed and Sealed this

Twelfth Day of April, 2005

JON W. DUDAS
*Director of the United States Patent and Trademark Office*